UNITED STATES PATENT OFFICE.

ALBRECHT SCHMIDT AND ERNST BRYK, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

RED-VIOLET DYE AND PROCESS OF MAKING SAME.

No. 916,029.  Specification of Letters Patent.  Patented March 23, 1909.

Application filed February 20, 1907. Serial No. 358,422.

*To all whom it may concern:*

Be it known that we, ALBRECHT SCHMIDT, Ph. D., and ERNST BRYK, Ph. D., chemists, being, respectively, citizens of the Empire of Germany and the Empire of Austria-Hungary, and residing at Höchst-on-the-Main, Germany, have invented certain new and useful Improvements in Red-Violet Dyes and Processes of Making the Same, of which the following is a specification.

We have found red-violet dyes and a process of making the same, said dyes being halogen substitution products of thioindigo for instance:

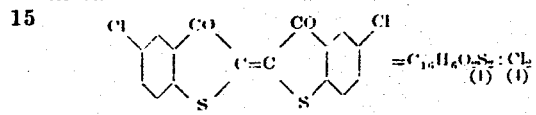

and its homologues, for instance:

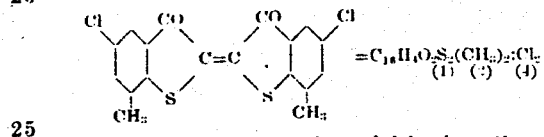

It is known that phenylthioglycolic acid cannot be transformed into thioindigo by sulfuric acid. If this acid be treated with fuming acid then according to the patent literature thioindigo sulfonic acid is obtained, but no vat dyestuff. We have found that contrary to the statement in literature relating to phenylthioglycolic acid those phenylthioglycolic acids which are halogen substituted in para-position and not substituted in one ortho-position may be transformed into vat dyestuffs if they are carefully treated in the heat with highly concentrated sulfuric acid for instance, of 66° Bé. or with monohydrate. By careful treatment the formation of sulfo-dyestuffs may be partly or wholly avoided. The treatment may be characterized generally by heating with sulfuric acid for so long or to such temperature, until the coloration assumed by the formed vat dyestuff in sulfuric acid occurs, mostly of a green tint, and not the coloration (mostly violet) of the corresponding sulfonic acid dyestuff. When purified these vat dyestuffs are insoluble in alkali carbonates and alkali hydrates and thus distinguish themselves from the sulfonic acid dyestuffs. When heated with reducing agents, for instance, with hydrosulfite in alkaline solution, they dissolve forming leuco compounds and dye from this solution cotton and wool in violet-red and red-violet tints. These vat dyestuffs may be obtained by dissolving the arylthioglycolic acids halogen substituted in para-position and not substituted in one ortho-position in several times the quantity of say concentrated sulfuric acid and by heating or allowing to stand at ordinary temperature, until the formation of the vat dyestuff or the intensity of the dyeing assumed by the vat dyestuff in sulfuric acid and the quantity of the alkali-insoluble product thus obtained no longer increase. The sulfuric acid, whether of 66° Bé. or monohydrate, and the temperature depend upon the nature of the substituents; in most cases condensation is effected with monohydrate. Agents accelerating the condensation and reducing the sulfonation may be added, for instance, bisulfate, pyrosulfate, boric acid, phosphoric acid, chlorids, aromatic sulfuric acids and the like. A better yield is often obtained by adding sulfur while condensing. On completion of the condensation the product of reaction is poured on ice; it is filtered, washed first with hot water and then to remove any unattacked parent material and small quantities of alkali-soluble bodies, with hot strongly dilute soda-lye and finally washed again with hot water, until the filtrate runs off completely colorless.

The parent materials may be obtained by known methods from the corresponding amins, for instance, by diazotizing an amin halogen-substituted in para-position and not substituted in ortho-position, by combining the diazo compound with a xanthogenate and by treating the xanthogen ester with chloracetic acid in alkaline solution, for instance, in alcohol alkaline solution.

In this manner we have obtained a series of vat dyestuffs, dyeing in the vat cotton and wool red of violet hue to red-violet and violet. We have obtained vat dyestuffs from halogen- phenyl- or halogen-tolylthioglycolic acids which correspond to the following amins:

| From— | Dyes in the vat | | Soluble in— | |
|---|---|---|---|---|
| | Cotton. | Wool. | Conc. H₂SO₄. | Hot nitrobenzene. |
| P-chloranilin (NH₂:Cl) 1:4 | Violet-red | Bordeaux | Greenish | Violet-red. |
| Dichloranilin (NH₂:Cl:Cl) 1:2:4 | Red-violet | " | " | " " |
| Dichloranilin (NH₂:Cl:Cl) 1:3:4 | " " | " | " | " " |
| Chlor-o-toluidin (NH₂:CH₃:Cl) 1:2:4 | " " | Red-violet | " | " " |
| Chlor-m-toluidin (NH₂:CH₃:Cl) 1:3:4 | " " | Claret-red | " | " " |
| Brom-o-toluidin (NH₂:CH₃:Br) 1:2:4 | " " | Red-violet | " | " " |
| P-brom-anilin (NH₂:Br) 1:4 | " " | " " | " | " " |
| Chlor-p-xylidin (NH₂:CH₃:Cl:CH₃) 1:2:4:5 | " " | " " | " | " " |

Example I. 1 part of arylthioglycolic acid halogen-substituted in para-position and not substituted in one ortho-position, for instance, the chlortolylthioglycolic acid from chloro-o-toluidin $$NH_2:CH_3:Cl = 1:2:4$$

is heated in the water bath for a short time with 5 parts of monohydrate or concentrated sulfuric acid, until the coloration and formation of the dyestuff no longer increase or heated for so long or to such temperature or allowed to stand at ordinary temperature that the sulfonic acid does not assume a noticeably gray-violet color. The product of reaction poured into water is purified in the manner above described; on reducing in alkaline solution with hydrosulfite red-violet tints are obtained on cotton and wool.

Having now described our invention, what we claim is:

1. The process herein described of making vat dyestuffs, which consists in allowing strong sulfuric acid to act on phenylthioglycolic acids halogen substituted in para-position and not substituted in one ortho-position.

2. As new products, the red-violet dyes of the general formula:

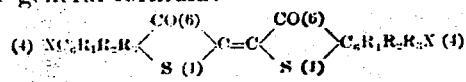

wherein X means a halogen (Cl,Br) and R₁ R₂ R₃ the substituents: hydrogen, halogen, methyl, being insoluble in water, in alkalies and in dilute acids; soluble in hot nitrobenzene with a violet-red color, in concentrated sulfuric acid with a greenish color, forming with an alkaline hydrosulfite a vat from which cotton is dyed in red-violet, and wool in claret-red shades.

3. As a new product, the dyestuff:

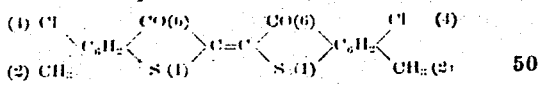

being insoluble in water, in alkalies and in dilute acids; soluble in hot nitrobenzene with violet-red color, in concentrated sulfuric acid with greenish color; forming with alkaline hydrosulfite a vat from which cotton is dyed red-violet, and wool claret-red shades.

In testimony, that we claim the foregoing as our invention, we have signed our names in presence of two subscribing witnesses.

ALBRECHT SCHMIDT.
ERNST BRYK.

Witnesses:
JEAN GRUND,
CARL GRUND.